United States Patent
Fujiwara (10) Patent No.: US 8,779,923 B2
(45) Date of Patent: Jul. 15, 2014

(54) APPARATUS, SYSTEM AND METHOD FOR BATTERY MANAGEMENT

(75) Inventor: Kazuya Fujiwara, Anjo (JP)

(73) Assignee: DENSO CORPORATION, Kariya (JP)

( * ) Notice: Subject to any disclaimer, the term of this patent is extended or adjusted under 35 U.S.C. 154(b) by 47 days.

(21) Appl. No.: 13/193,290

(22) Filed: Jul. 28, 2011

(65) Prior Publication Data

US 2012/0050054 A1 Mar. 1, 2012

(30) Foreign Application Priority Data

Aug. 27, 2010 (JP) ................................. 2010-191022

(51) Int. Cl.
*G08B 13/14* (2006.01)
*H01M 10/42* (2006.01)
*B60L 11/18* (2006.01)

(52) U.S. Cl.
CPC ............. *B60L 11/1846* (2013.01); *Y02T 90/16* (2013.01); *Y02T 10/7072* (2013.01); *Y02E 60/12* (2013.01); *Y02T 10/7061* (2013.01); *H01M 10/425* (2013.01); *B60L 2250/20* (2013.01); *Y02T 90/163* (2013.01); *B60L 11/1864* (2013.01); *B60L 2240/70* (2013.01); *Y04S 30/14* (2013.01); *Y02T 10/7005* (2013.01); *H01M 2010/4278* (2013.01); *B60L 11/1822* (2013.01); *Y02T 90/14* (2013.01); *Y02T 90/124* (2013.01); *Y02T 90/128* (2013.01); *Y02T 90/169* (2013.01)
USPC ....... 340/572.1; 340/10.1; 340/505; 340/501; 340/10.51; 455/418; 455/95; 455/557

(58) Field of Classification Search
CPC .................... B60L 11/1809; H02J 2007/0001; H02J 2007/0098; Y02E 60/721; Y02T 10/7005; Y02T 90/14; Y02T 90/169; G07C 9/00111; Y04S 30/14; B60S 5/06
See application file for complete search history.

(56) References Cited

U.S. PATENT DOCUMENTS

| | | | |
|---|---|---|---|
| 6,456,039 B1 * | 9/2002 | Lauper et al. | 320/107 |
| 7,042,346 B2 * | 5/2006 | Paulsen | 340/438 |
| 8,387,113 B2 * | 2/2013 | Shimada et al. | 726/3 |

(Continued)

FOREIGN PATENT DOCUMENTS

| | | |
|---|---|---|
| JP | 2004-126669 A | 4/2004 |
| JP | A-2006-311423 | 11/2006 |

OTHER PUBLICATIONS

U.S. Appl. No. 13/193,185, filed Jul. 28, 2011, Kuroiwa.
U.S. Appl. No. 13/192,689, filed Jul. 28, 2011, Shinoda.

(Continued)

*Primary Examiner* — Benjamin C Lee
*Assistant Examiner* — Curtis King
(74) *Attorney, Agent, or Firm* — Posz Law Group, PLC (57) ABSTRACT

A vehicle having a battery package as a power source includes a memory device for storing authentication information of battery modules in the battery package. A battery controller in the vehicle has an authentication unit. The authentication unit determines whether the battery module is a genuine product or not. When the battery module is not a genuine product, a control unit controls a communication unit to send information indicative that the battery module is not a genuine product. The information sent from the communication unit is recorded in a server of a public organization, such as an administrative organization or the like. The information recorded in the server of the administrative organization is utilized by the administrative organization or by a vehicle manufacturer, for an action that advises the user to use the genuine battery.

6 Claims, 6 Drawing Sheets

(56) References Cited

U.S. PATENT DOCUMENTS

| | | | |
|---|---|---|---|
| 2003/0167123 A1* | 9/2003 | Nakazawa et al. | 701/301 |
| 2005/0107898 A1* | 5/2005 | Gannon et al. | 700/90 |
| 2005/0156572 A1* | 7/2005 | Nunomaki et al. | 320/132 |
| 2006/0033836 A1 | 2/2006 | Umeyama | |
| 2007/0214296 A1 | 9/2007 | Takamatsu et al. | |
| 2008/0024268 A1* | 1/2008 | Wong et al. | 340/5.8 |
| 2009/0134973 A1* | 5/2009 | Sandler et al. | 340/10.1 |
| 2009/0256717 A1 | 10/2009 | Iwai | |
| 2012/0011362 A1* | 1/2012 | Lambert | 713/168 |

OTHER PUBLICATIONS

U.S. Appl. No. 13/192,649, filed Jul. 28, 2011, Kurimoto.
U.S. Appl. No. 13/192,603, filed Jul. 28, 2011, Tanaka.
Office Action dated Oct. 22, 2013 in the corresponding CN application No. 201110252875.7 (English translation).
Office Action mailed Nov. 12, 2013 in the corresponding JP application No. 2010-191022 (English translation).

* cited by examiner

APPARATUS, SYSTEM AND METHOD FOR BATTERY MANAGEMENT

CROSS REFERENCE TO RELATED APPLICATION

The present application is based on and claims the benefit of priority of Japanese Patent Application No. 2010-191022, filed on Aug. 27, 2010, the disclosure of which is incorporated herein by reference.

TECHNICAL FIELD

The present disclosure generally relates to a battery management system, apparatus, and method used in a battery-driven device, which operates on an electric power of a battery.

BACKGROUND INFORMATION

A battery-driven device, which is powered by a battery, and a battery management system is disclosed in Japanese Patent JP 2007282471. Based on JP 2007282471 a memory element in the battery stores information that the battery is genuine. Further, the battery-driven device has a checker that performs a process to determine whether a battery connected to the battery-driven device is a genuine battery. Such a process may be referred to as "authentication."

The battery-driven device authenticates the battery by reading the information from the memory element of the battery. When the battery is authenticated, the device permits a normal use of the battery-driven device. When the authenticated genuine battery is out of order, the use of the battery is not permitted. On the other hand, when the battery is not authenticated, the device notifies the user of the battery driven device that a non-genuine battery is being used. Further, the use of the non-genuine battery is permitted after notifying that the user uses the battery at his/her own risk.

In the conventional device, the use of the non-genuine battery is simply recognized and simply recorded by the battery-driven device. In other words, for a person other than the user of the battery-driven device, it is difficult to recognize that the non-genuine battery is used in the battery-driven device. In addition, only the battery-driven device records the use of the non-genuine battery.

Furthermore, the notice of the use of the non-genuine battery is provided for the user only from the battery-driven device, and it is solely left to the user whether the user stops the use of the non-genuine battery and switches the battery to a genuine one. As a result, the conventional device typically allows the user to continue the use of the non-genuine battery. In other words, it is difficult for the conventional device to effectively encourage the user to switch to the genuine battery.

The above-described problem may arise not only when the non-genuine battery is used, but, for example, when use of an illegally-acquired genuine battery is allowed, or when a use of an expired genuine battery is allowed. That is, the conventional device causes various problems due to the use of a "non-compliant" battery (i.e., a battery not compliant to a maker-specified requirement) such as a non-genuine battery, an illegally-acquired genuine battery, or an expired genuine battery.

In addition, a battery compliant to the maker-specified requirement may also be problematic when, for example, the battery is worn out. The use of such battery may be recognized based on use condition information. However, the conventional device cannot notify such a problem to a person except for the user.

SUMMARY

In view of the above and other problems, the present application provides an apparatus, a system and a method of battery management to enable the user to obtain use condition information of a target battery, regarding whether the target battery in use is compliant to the maker-specified requirement, from an apparatus, which is different from a device driven by the target battery.

In addition, the battery management of the present application transmits the use of the non-compliant battery to a third party.

Further, the battery management of the present application effectively encourages the user of the battery-driven device to use a compliant battery.

Further, the battery management of the present application effectively prevents the use of the non-compliant battery.

The present application uses following techniques for achieving the above-described purposes.

In an aspect of the present disclosure, a battery management apparatus comprises a battery checker to determine if a battery in a battery driven device is compliant to a maker-specified requirement, and a transmission unit to send out information indicative of a use condition of the battery from a battery-driven device and a check result of the battery by the battery checker.

According to the above configuration, information of the battery regarding whether the battery is compliant to the maker-specified requirement or not and use condition information of the battery can be transmitted to a device other than the battery-driven device. Therefore, the use of the battery may not only be determined by the user, but may be determined by an external organization such as a battery maker or the like. Further, by sending battery information that the battery is non-compliant to the battery maker or the administrative organization, or by sending the use condition information of the battery when the battery is a compliant one, the use of the compliant battery can be promoted and/or recommended.

Further, when the battery checker yields a negative check result about the requirement of the battery, the transmission unit sends out information indicative of a use of a battery that is non-compliant to the maker-specified requirement. According to this configuration, the use of the non-compliant battery is notified to the device other than the battery-driven device.

Further, the transmission unit sends the information to a recorder of an organization related to the battery-driven device or the battery. According to this configuration, the information is transmitted to a recorder of an organization related to the battery-driven device or to a recorder of an organization related to the battery.

Further, the battery checker includes a first checker to determine if the battery is a genuine product; a second checker to determine if the battery is functional; and the transmission unit sends information indicative that the battery is non-compliant to the maker-specified requirement when at least one of the first checker and the second checker yields a negative check result.

According to this configuration, the information is transmitted when the battery is not a genuine product, or when the battery is not functionally proper. Therefore, the use of the non-genuine battery is notified to the device other than the battery-driven device. Further, the use of the functionally-improper battery is notified to the device other than the battery-driven device.

The battery management apparatus further includes an information checker for checking whether battery liability information indicative of battery liability is available, and the transmission unit sends the battery liability information when the information checker outputs a positive check result. According to this configuration, the battery liability information, which indicates who is responsible of the battery, is transmitted.

A battery management system comprises a battery checker to determine if a battery in a battery driven device is compliant to a maker-specified requirement, a transmission unit to send out information indicative of a use condition of the battery from a battery-driven device and a check result of the battery by the battery checker, a receiver in an organization that is related to the battery-driven device or the battery for receiving information from the transmission unit; and a recorder in the organization for recording the information received by the receiver.

The battery management system further includes a contact unit in the organization for sending a message to a user of the battery-driven device based on the information recorded by the recorder. The message encourages the user to use a battery that is compliant to the maker-specified requirement. According to this configuration, the organization contacts the user of the battery when the non-compliant battery is used. Therefore, use of the compliant battery is effectively promoted and encouraged for the user of the battery-driven device.

Further, the organization is a public administration that administers a responsible organization that is at least responsible for the battery-driven device or the battery. According to this configuration, use of the compliant battery is effectively promoted and encouraged for the user of the battery-driven device.

Further, a method of managing a battery-driven device comprising checking whether a battery connected to a battery-driven device is compliant to a maker-specified requirement, transmitting information indicative of use of a non-compliant battery from the battery-driven device when the checked battery is the non-compliant battery to an organization related to one of the battery-driven device and the battery, recording the transmitted information in a recorder of the organization. According to this configuration, use of the non-compliant battery is notified to the organization related to the battery-driven device or to the organization related to the battery.

Further, sending a message to a user of the battery-driven device based on the information recorded by the recorder, from the organization. The message encourages the user to use a battery that is compliant to the maker-specified requirement. According to this configuration, the organization contacts the user by sending a message to the user, for recommendation of use of the compliant battery. Therefore, use of the compliant battery is effectively encouraged for the user of the battery-driven device.

Further, the organization is one of a responsible organization that is at least responsible for the battery-driven device or the battery and a public administration that administers the responsible organization. According to this configuration, use of the compliant battery is effectively encouraged to the user of the battery-driven device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

In the following, embodiments of the present application are described with reference to the drawings. Like parts have like numbers in those embodiments, and redundant portions may be omitted from some of those embodiments for brevity. When only a part of the configuration is explained in an embodiment, the other part of the configuration is applicable. Combinations of different embodiments are not only limited between the ones that are explicitly designated as combinable, but are also possible between the other embodiments, as long as there is no hindrance to prohibit the combination.

Figure 1:
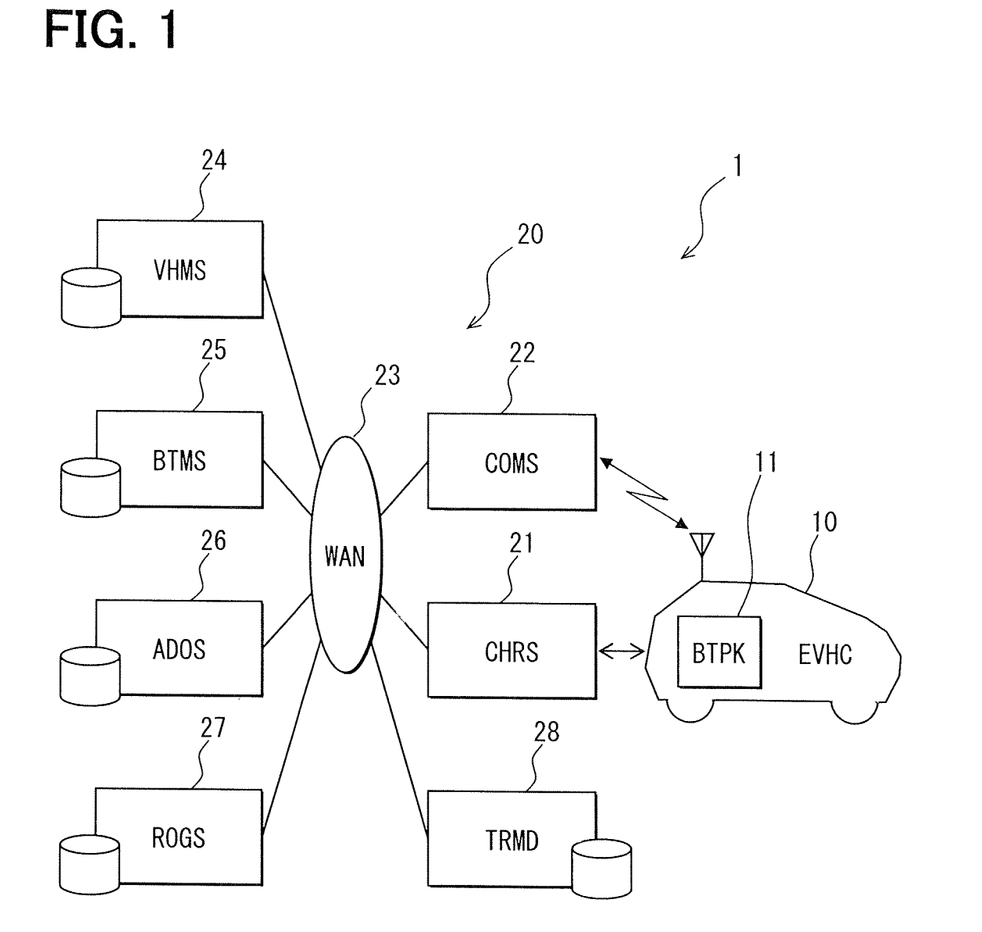
FIG. 1 is a block diagram of a battery management system in a first embodiment in accordance with the present disclosure.

With reference now to FIG. 1 a battery management system 1 comprises a vehicle (EVHC) 10 and a ground facility 20 disposed on the ground. The vehicle 10 is a battery-driven device operated by a battery 11. The vehicle 10 generates at least a part of its driving power by using a motor. For example, the vehicle 10 may be a battery car driven only by a motor, or a hybrid car in which an internal combustion engine is used together with the motor.

The ground facility 20 includes a charge station (CHRS) 21 and a communication facility (COMS) 22. The charge station 21 includes a charger for charging a battery 11 in the vehicle 10 and a data communications equipment to connect to a wide area network (WAN) 23. The communication facility 22 is a communications equipment of a carrier, and is wirelessly communicable with communication equipment in the vehicle 10. For example, the communication facility 22 is a ground station of a mobile telephone service company. The communication facility 22 includes a data communications equipment to connect to WAN 23. WAN 23 serves as a communication line. For example, WAN 23 is provided through Internet.

The ground facility 20 also includes a server of vehicle manufacturers (VHMS) 24, a server of battery manufacturers (BTMS) 25, a server of administrative organization (ADOS) 26, and a server of related organizations (ROGS) 27, which may be referred to as servers 24, 25, 26, 27. Servers 24, 25, 26, 27 are connected to WAN 23. The components of the ground facility 20, that is, charge station 21, the communication facility 22, the server 24, 25, 26, 27, are mutually in data communication through WAN 23.

The ground facility 20 may be equipped with an input terminal 28. For example the input terminal 28 may be a personal computer connectable to WAN 23, a portable terminal, or a cellular phone. The input terminal 28 is connectable to the server 24, 25, 26, 27 in the ground facility 20. That is, for example, through communication to the server ADOS 26, the input terminal 28 sets, modifies, or initializes information regarding authentication of the battery 11, together with other processes. The input terminal 28 may be provided as a navigation apparatus including a display unit 15 on the vehicle 10.

The server 24, 25, 26, 27 each include a recording device for recording information provided from WAN 23. The contents of the recording device can be used by the individual servers, and can also be read by a third party. The server VHMS 24 can be read by a manufacturer of the vehicle 10. The manufacturer of the vehicle 10 is an organization related to a battery-driven device, and may be designated as a responsible organization which is responsible for the vehicle 10. The server BTMS 25 can be read by a manufacturer of the battery 11. The manufacturer of the battery 11 is an organization related to the battery, and may be designated as a responsible organization that is responsible for the battery 11.

The responsible organization(s) may be responsible for product liability, a service provision obligation for providing a service that is designated in a contract paper, a social responsibility for preventing an accident and providing relief, together with other responsibilities. For example, the vehicle manufacturer of the vehicle 10 and the battery manufacturer of the battery 11 are considered to bear a few responsibilities regarding their products and its use.

The server ADOS 26 can be read by an administrative organization. The administrative organization is an organization related to a battery-driven device or a battery. The administrative organization may be a public organization for substantially administering the responsible organization that is responsible for the vehicle 10 or the battery 11. The public organization includes an organization belonging to a national government or a local government, such as, a governmental organization controlling road traffic, a governmental organization controlling a consumer safety, or the like. The public organization may include a "substantially" public organization, such as, a product authentication organization for authenticating a product such as a battery that has passed a quality test, a performance test or the like. Such an organization may include a non-governmental organization related to a traffic safety or a consumer safety, a non-profit organization, or a corporation. For example, the public organization includes an organization providing security for the vehicle 10 or the battery 11, an insurance company for providing insurance for the vehicle 10 or the battery 11, and an organization for organizing a vehicle user membership. The public organization may further include a non-profit organization that promotes a vehicle safety through public advertisement. These public organizations directly or indirectly control and substantially administer the responsible organizations. That is, the governmental organization controls and administers the vehicle manufacturers and the battery manufacturers based on applicable laws and regulations. Further, the companies and corporations as well as non-profit organizations may also control and administer, through advertisement and information communication to the public, the vehicle manufacturers and the battery manufacturers.

The server ROGS 27 may be read by a related organization, which is an organization related to the vehicle 10 and the battery 11. For example, the related organization may include a police department, an organization related to credit information of the user of the vehicle 10 that provide authentication for personal information of the user, an insurance company providing insurance for the vehicle 10 or the battery 11 may be included in the related organization, or the like Further, the ground facility 20 may be equipped with an input terminal 28. The input terminal 28 is provided as one of the following devices, i.e., a personal computer that is connectable to a wide area network 23, a portable terminal, or a cellular phone. The input terminal 28 is configured to be communicable with a server that is included in the ground facility 20. For example, the input terminal 28 performs an information setting/correction/reset process or the like regarding the authentication process of the batter 11, by communicating with the server (ADOS) 26. The input terminal 28 may be provided as a navigation apparatus having a display unit 15 in the vehicle 10 or the like.

Figure 2:
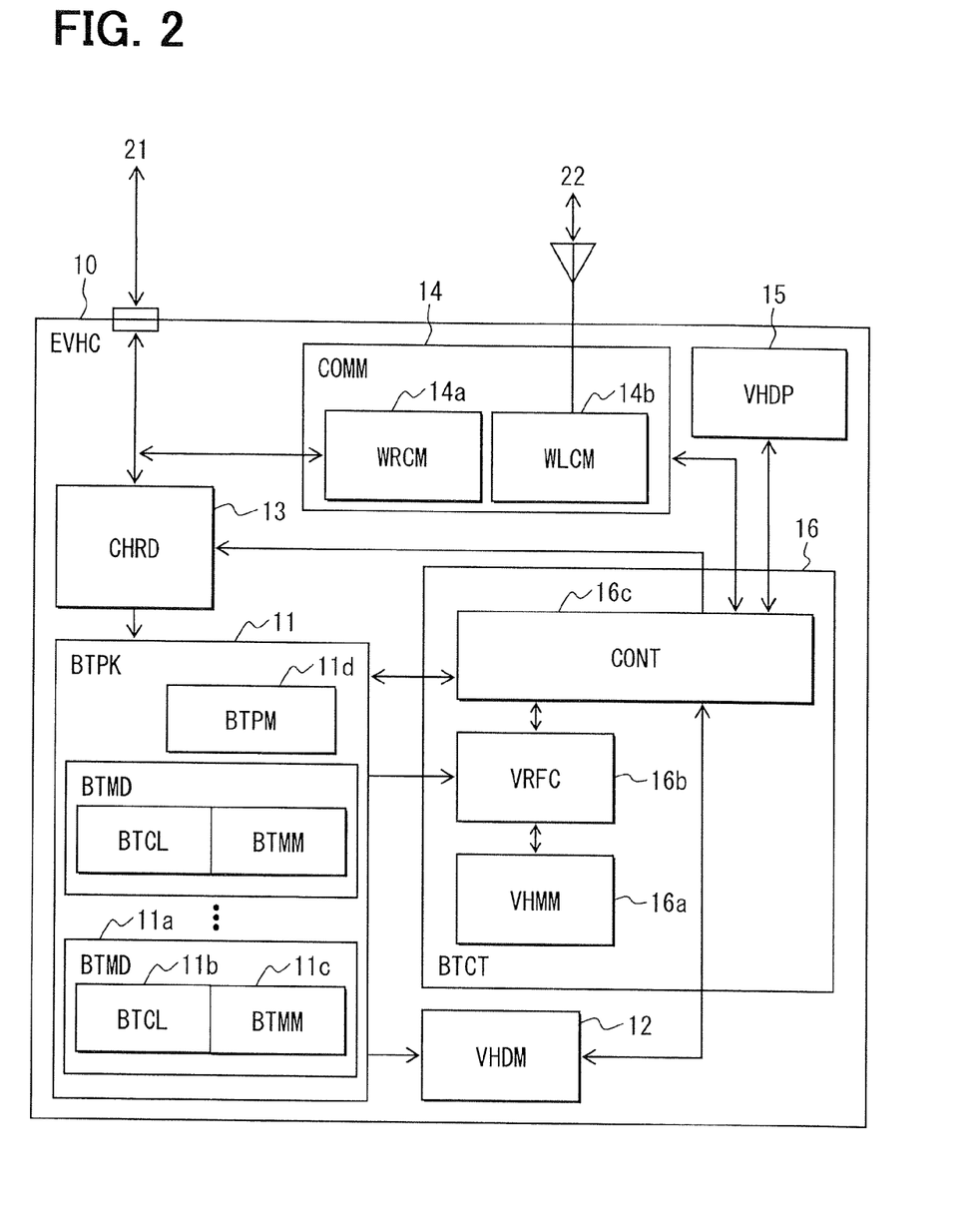
FIG. 2 is a block diagram of a vehicle part of the battery management system in the first embodiment.

FIG. 2 is a block diagram of a vehicle part disposed in the vehicle 10 of the battery management system 1. In the battery management system 1, the battery 11 is installed in the vehicle 10. The battery 11 may be referred to as battery package (BTPK) 11. The battery package 11 has a plurality of battery modules (BTMD) 11a installed thereon. Each of the battery modules 11a is replaceable. The battery module 11a includes a battery cell (BTCL) 11b and a memory device (BTMM) 11c. The battery cell 11b is a basic component of the battery 11. The battery cell 11b may be a lithium ion battery. The memory device 11c is a part of the battery 11, which cannot be removed from the battery module 11a without breaking it. The memory device 11c memorizes authentication information to authenticate the battery module 11a. The authentication information may include identification information (ID) of the battery module 11a and management information. The identification information may include a code showing that the battery module 11a is a genuine battery and a code showing that the battery module 11a is distributed to an authorized distribution channel. The management information is for managing a use of the battery module 11a compliant to specification. That is, the management information specifies a warranty period, a maximum number of use, a charge condition, a discharge condition, and the like of the battery module 11a. The memory device 11c memorizes security information related to the battery 11.

Further, the battery package 11 includes a storage device (BTPM) 11d. The storage device 11d memorizes management information about the whole battery package 11. The management information specifies a warranty period, a charge condition, a discharge condition, and the like of the whole battery package 11. Further, the charge condition of the whole battery package 11 specifies, as a condition of restricted charging, a restricted charge amount and a restricted number of charging.

In the vehicle 10, a genuine battery specified by a vehicle maker or a non-genuine battery that is compatible with the genuine battery may be used as the battery 11 or the battery module 11a. For example, the "genuine" battery may indicate a battery that is specified by a maker of the vehicle 10, or a seller of the vehicle 10. Further, the "genuine" battery may indicate a battery that is specified by both the maker of the vehicle 10 and the maker of the battery 11 as a suitable battery for use in the vehicle 10. Furthermore, the "genuine" battery may indicate a battery that is specified by an organization of the makers of the vehicle 10 and/or the makers of the battery 11. The "genuine" battery may include a near-genuine battery that is specified by a public organization, or a near-genuine battery that is specified by an organization of makers and/or sellers. In other words, a battery is proven to be "genuine" not by a label on the battery but by a battery authentication performed by a computer in the vehicle 10.

The non-genuine battery means batteries without warranty, or without authentication by a reliable organization. Those batteries may be designated as a non-compliant battery. The non-genuine batteries may or may not have recorded information on a responsibility of the product (e.g., a product liability), which can be readable by a computer, for identifying a person, a company, or an organization in charge of the battery. Those non-genuine batteries cannot be authenticated by a computer in the vehicle 10. The non-genuine battery may be called as a third party product, or a copy product.

The battery 11 is not considered as "proper" when the warranty period is expired, or when the maximum times of use is surpassed. That is, even when the battery 11 is a genuine one, the warranty-expired battery or the max-use-time-surpassed battery is not considered as "proper", and may also be referred to as an improper battery. An improper battery are batteries that are not in proper use condition, or are in a no-guarantee condition for use, which may also include a battery that may be broken. The proper battery can be authenticated by a computer in the vehicle 10. A proper battery may also be referred to as a functionally-proper battery or the like. An improper battery may also be referred to as not functionally-proper battery or the like.

Further, a legally-acquired battery and an illegally-acquired battery are included in a category of the genuine battery. The legally-acquired battery is acquired via an authorized distribution channel, and installed in the vehicle 10 by an authorized procedure. The illegally-acquired battery is a battery acquired illegally from an un-authorized channel or the like. For example, stolen products are categorized as an illegally-acquired battery. The legally-acquired battery can be authenticated by a computer in the vehicle 10.

A normal battery means that a battery is (a) a genuine one, (b) a functionally-proper one, and (c) a legally-acquired one. An abnormal battery means that a battery is either (d) a non-genuine one, (e) not functionally-proper one, or (f) an illegally-acquired one. When a battery is expressed as "normal," the battery is a genuine one, a functionally-proper one, and a legally-acquired one. When a battery is expressed as "abnormal," the battery is either a non-genuine one, not functionally-proper one, or an illegally-acquired one.

The vehicle 10 has a drive mechanism (VHDM) 12 installed therein. The drive mechanism 12 drives the vehicle 10 on electricity supplied from the battery 11. The drive mechanism 12 includes an electric motor. Further, the drive mechanism 12 may include an internal combustion engine generating a driving power of the vehicle 10.

The vehicle 10 has a charge device (CHRD) 13 installed therein. The charge device 13 controls charging of the battery 11. When the vehicle 10 is connected to the charge station 21 by a charge line, the charge device 13 controls charging to the battery 11 from the charge station 21. The charge device 13 may have a breaker for permitting and prohibiting charging of the battery 11 according to an input signal from outside of the charge device 13. The charge device 13 may have a charge amount control unit for controlling a charge amount of the battery 11. The charge amount of the battery is controlled to a certain amount between a minimum charge amount and a maximum charge amount according to the input signal.

The vehicle 10 has a communication device (COMM) 14 installed therein. The communication device 14 is in communication with at least one server through a wired connection or a wireless connection. The communication device 14 includes a wired communication device (WRCM) 14a communicating with the charge station 21 through a charge line. Further, the communication device 14 includes a wireless communication device (WLCM) 14b communicating wirelessly with the communication facility 22 through a cellular phone network. The communication device 14 transmits data to an outside server, i.e., a memory device in an outside of the communication device 14, through one of the wired communication device 14a or the wireless communication device 14b. The communication device 14 is in communication with at least one of the server VHMS 24 of the vehicle manufacturer and the server ADOS 26 of the administrative organization, and may be in communication with additional servers.

The vehicle 10 has a display unit (VHDP) 15 installed thereon. The display unit 15 displays a message for the user such as a vehicle driver of the vehicle 10. In addition, the user of the vehicle may mean an owner of the vehicle, a manager of the vehicle, a driver of the vehicle, or a passenger of the vehicle. The display unit 15 may be provided as a meter unit, a navigation unit an imaging device on the vehicle 10.

The vehicle 10 has a battery control unit (BTCT) 16 installed thereon. The battery control unit 16 is provided as a microcomputer equipped with a computer-readable storage medium. The storage medium stores a computer-readable program. The storage medium may be provided as a memory. The program may be executed by a control unit for controlling the battery control unit 16 to be serving as a device described in this specification, for performing a control method described in this specification. The battery control unit 16 further includes a memory unit (VHMM) 16a, an authentication unit (VRFC) 16b and a control unit (CONT) 16c. These components 16a, 16b, 16c may be provided as a microcomputer circuit and a program executed therein.

The battery control unit 16 controls the battery 11, the drive mechanism 12 and the charge device 13 so that the battery 11 is used properly. The battery control unit 16 is configured to perform the above-described control according to a condition of the battery 11. The battery control unit 16 further performs an authentication control to restrain the use of the non-compliant battery, while preventing inconvenience of the user. The battery control unit 16 has a battery checker for checking whether a battery is compliant to a maker-specified requirement. Further, the battery control unit 16 further includes a control unit for controlling the charge device and/or the drive mechanism according to a check result of the battery checker and a transmission unit for sending out relevant information through a communication channel according to the check result of the battery checker. The above-described function units of the battery control unit 16 may be called as function blocks or modules.

A battery management apparatus includes, as a main component, the battery control unit 16 installed in the vehicle 10. A part of the battery management apparatus is included in the ground facility 20. For example, a part of the battery checker may be installed in the ground facility 20. Further, information indicative of the use of the non-compliant battery may be configured to be relayed by a plurality of servers, to be stored in the recording device. In such a configuration, a part of the transmission unit is installed in the ground facility 20.

A memory unit 16a memorizes authentication information to authenticate the battery 11. The authentication information, which may also be referred to as the maker-specified requirement, may include a code to authenticate a genuine battery, a code to authenticate a properly-functioning battery, and a code to authenticate a legally-acquired battery.

An authentication unit 16b serves as the battery checker for checking whether the battery is genuine or not. The authentication unit 16b includes a reader unit for reading the identification information and the management information from the battery 11 as well as a retrieval unit for retrieving the authentication information memorized in the memory unit 16a. The authentication unit 16b includes a means to determine whether a battery is a genuine battery or not based on the authentication information and the identification information. The authentication unit 16b determines whether a battery module is compliant or not, for each of a plurality of the battery modules 11a.

The determination whether or not a battery is a genuine battery can be carried out by the following process. For example, predetermined identification information is issued only for a genuine battery. The manufacturer of the battery 11 stores the issued information to the memory device 11c. The authentication information, which is the same as the identification information, is registered in the memory unit 16a. When the identification information accords with the authentication information, the authentication unit 16b authenticates the battery as a genuine one. When the battery module 11a is put on the vehicle 10, a code same as the identification information may be registered in the memory unit 16a as the authentication information. By employing a particular procedure or a particular device for reading the identification information from the memory device 11c or for registration of the authentication information in the memory unit 16a, unauthorized registration is prevented.

The genuine battery may have the identification information that is issued by using a predetermined encrypting code in other protection schemes. For example, the manufacturer of the battery stores the issued identification information to the memory device 11c. The memory unit 16a registers a code for decrypting the identification information as the authentication information. The authentication unit 16b decrypts the identification information by using the authentication information, and the authentication information 16b authenticates the battery as a genuine one when predetermined information is retrieved. In yet another scheme, predetermined identification information is issued only for a genuine battery. The authentication unit 16b accesses the server 27 of the related organization through the communication device 14, and determines whether the identification information is for a genuine battery. In this case, the battery checker is as a combination of the authentication unit 16b and the server 27. The authentication scheme of the genuine battery based on the identification information may be implemented by employing various authentication techniques.

Based on the management information the authentication unit 16b includes a means for determining whether a battery is properly functioning or not. The authentication unit 16b determines whether a battery is functioning for each of a plurality of the battery modules 11a, which is used to determine if the battery is proper or improper. The determination whether or not a battery is proper may be carried out by the following process. The memory device 11c memorizes warranty information indicative of a warranty period of the battery 11 as the management information. The authentication unit 16b determines whether the warranty period has expired. If the warranty period has not expired, the battery 11 is determined as proper, or, the battery 11 is determined as compliant. If the warranty period has expired, the battery 11 is determined as improper, or is determined as non-compliant. In another scheme, the memory device 11c memorizes information indicative of a maximum number of charge operations as the management information. The authentication unit 16b determines whether the maximum number of charge operations is surpassed. If the maximum number of charge operations is not surpassed, the battery 11 is determined as proper, or is determines as compliant. If the maximum number of charge operations is surpassed, the battery 11 is determined as improper, or is determined as non-compliant.

The authentication unit 16b includes a means to determine whether a battery is a legally-acquired battery, based on the authentication information and the identification information. The authentication unit 16b determines whether or not a battery is a legally-acquired battery, for each of a plurality of the battery modules 11a. The determination whether or not a battery is a legally-acquired battery can be carried out by the following process. A predetermined identification information is issued only for a genuine battery supplied to an authorized distribution channel. The manufacturer of the battery 11 stores the issued identification information to the memory device 11c. When the battery module 11a acquired via the authorized distribution channel is installed on the vehicle 10, predetermined and authorized registration process is carried out. By the registration process, the authentication information same as the identification information is registered to the memory unit 16a. When the identification information accords with authentication information, the authentication unit 16b authenticates the battery module 11a as a legally-acquired product. The authentication scheme of the legally-acquired battery based on the identification information may be implemented by employing various authentication techniques.

The control unit 16c controls the battery 11, the charge device 13 and the drive mechanism 12 according to the authentication result by the authentication unit 16b. The control unit 16c may provide a means to allow or prohibit charging according to the authentication result, a means to limit an electricity charge amount according to the authentication result, and a means to restrict a travel of the vehicle by using the battery 11 according to the authentication result. When a non-compliant battery is used, the control unit 16c and the communication device 14 serve as a transmission unit for sending out information indicative of the use of the non-compliant battery to the external servers 24, 26 through WAN 23.

Figure 3:
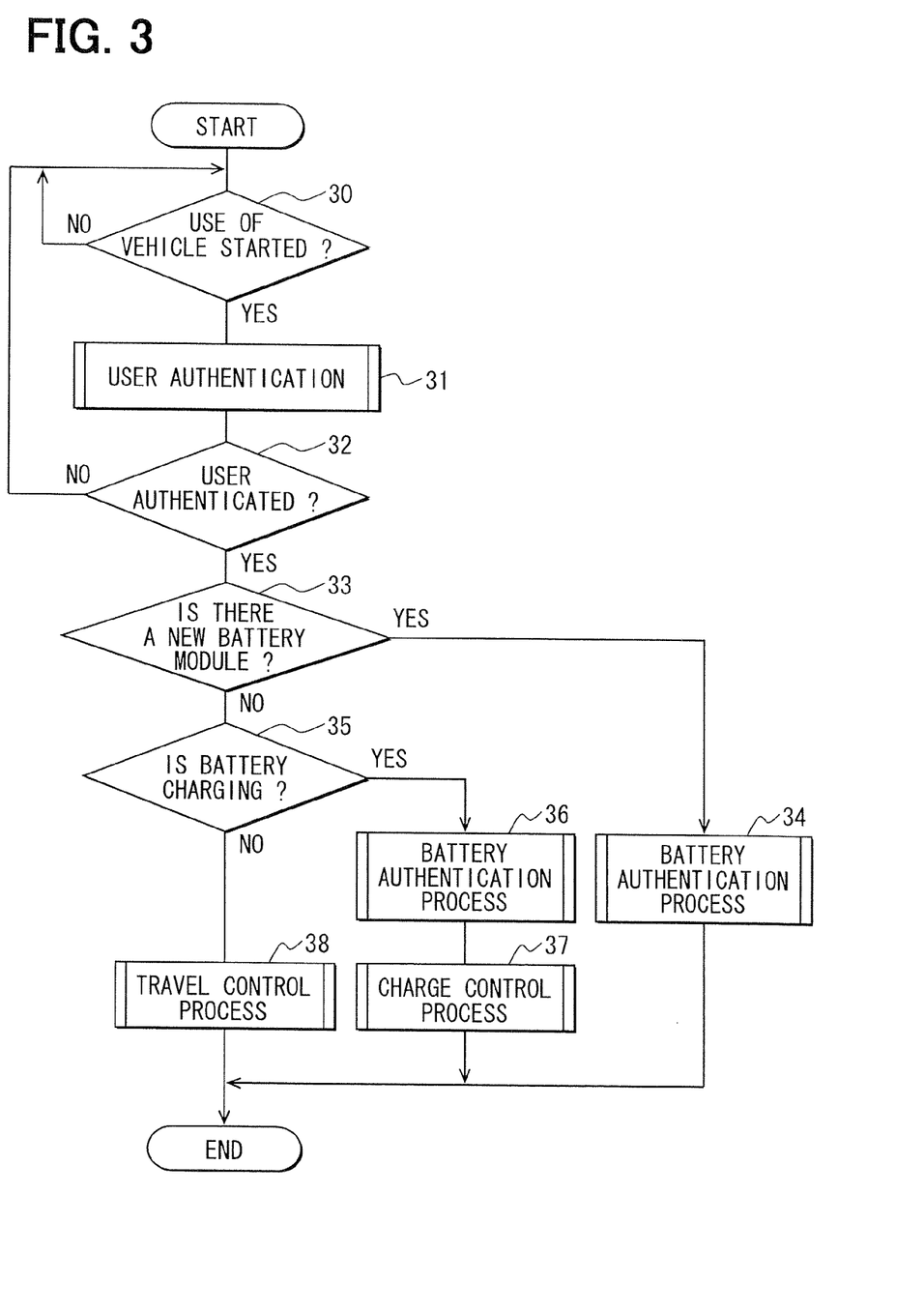
FIG. 3 is a flowchart of control of the battery management system in the first embodiment.

The operation of the battery management system 1 of the first embodiment and a battery management method are explained with reference to the flowcharts. FIG. 3 is a flowchart showing an operation of the battery management apparatus of vehicle 10. First it is determined whether it is a start of use of the vehicle 10 in step 30. In other words, when an occupant gets in the vehicle 10, it is determined whether or not a power switch of the vehicle 10 is operated to an ON position. When it is determined that the use of the vehicle 10 is not started, the process returns to step 30. When it is determined that the use of the vehicle is started, the process proceeds to step 31. In step 31, a user authentication process is carried out to determine whether a person who is going to use the vehicle 10 has a fair authority. For example, it is determined whether a key or an electronic code owned by a user has authenticity. In step 32, it is determined whether use of the vehicle 10 is approved by the user authentication of step 31. When use of the vehicle 10 is prohibited, the process returns to step 30. When use of the vehicle 10 is permitted, the process is advanced to step 33.

The process in steps 30 to 32 is carried out by a security device in the vehicle 10 or an immobilizer in the drive mechanism 12. Note that the user authentication process in step 31 is different from the battery authentication process in later steps 34 and 36. Security of the battery information is improved by carrying out the battery authentication process after an affirmative determination in the user authentication.

In step 33, it is determined whether at least one of the battery modules 11a is a newly replaced module. If the battery module 11a includes a newly replaced module, the battery authentication process is carried out in step 34, which is discussed below and shown in FIG. 4. The battery authentication process is carried out by the authentication unit 16b and the control unit 16c.

When the battery module 11a is not just after replacement, the process proceeds to step 35. In step 35, it is determined whether the user is going to carry out charging. When the user stops the vehicle 10 in front of the charge station 21 and connects a charge line to the vehicle 10, the process proceeds to step 36. In step 36, the battery authentication process is carried out, which is discussed below and shown in FIG. 4. The battery authentication process is carried out by the authentication unit 16b and the control unit 16c. In step 37, a charge process to charge the battery 11 is carried out. The charge process is carried out by a control unit in the charge device 13. Further, in the charge process, an authentication result in the battery authentication process is referred to, and the charge process is carried out based on the authentication result of the battery authentication.

On the other hand, when it is determined that the user is not charging, the process proceeds to step 38. In step 38, a travel control process to use the battery 11 as a power supply is carried out. The travel control process is carried out by a control unit in the drive mechanism 12. Further, before the travel control process, the battery authentication process may be carried out. In such a case, in the travel control process, an authentication result in the battery authentication process is referred to, and the travel control process is carried out based on the authentication result of the battery authentication process.

Figure 4:
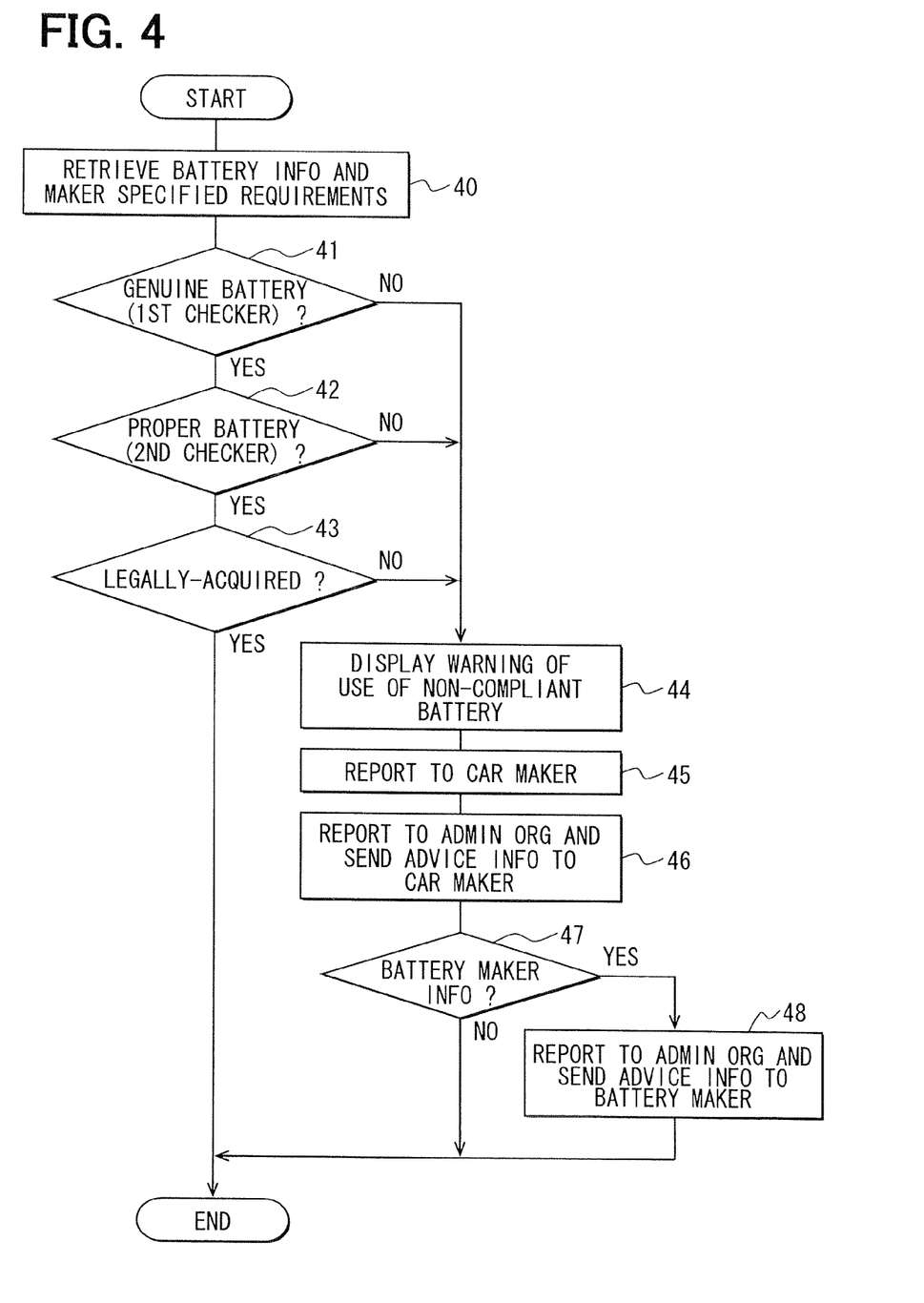
FIG. 4 is a flowchart of control of the battery management system in the first embodiment.

FIG. 4 is a flowchart of the battery authentication process. First, in the battery authentication process, identification information and battery information including management information are retrieved from the battery 11 in step 40. Further, in step 40, the authentication information or the maker-specified requirement memorized in the memory unit 16a is retrieved.

In step 41, it is determined whether the battery 11 is a genuine product suitable to the vehicle 10 based on the identification information and the authentication information. For example, this determination can be carried out based on whether a code showing a genuine product is included in the identification information. Step 41 serves as "a first checker" to determine whether a battery is a genuine battery. Step 41 is carried out for each of the battery modules 11a. The process proceeds to step 44 if any one of the battery modules 11a is found to be non-genuine.

In step 42, it is determined, based on the management information retrieved from the battery 11, whether the battery 11 is proper. In other words, it is determined whether the battery 11 is functionally-proper. Step 42 serves as "a second checker" to determine whether a battery is functionally-proper. Step 42 is carried out for each of the battery modules 11a. The process proceeds to step 44 when any one of the battery modules 11a is found to be not functionally-proper.

In step 43, it is determined whether the battery 11 is a legally-acquired battery. In other words, it is determined if the battery 11 is acquired via the authorized distribution channel, and it is determined whether the battery 11 is installed in the vehicle 10 by an authorized procedure. For example, this determination can be carried out by determining whether the identification information is associated with the information that is unique to the vehicle 10. Step 43 is carried out for each of the battery modules 11a. The process proceeds to step 44 when any one of the battery modules 11a is found to be illegally-acquired.

The battery 11 is now determined as a normal battery when it is determined as genuine in step 41, determined as functionally-proper in step 42, and determined as legally-acquired in step 43. Then, the battery 11 is authenticated, and the battery authentication process is finished. Because it is determined as a normal battery, a normal charge control for the battery 11 and a normal travel control for the vehicle 10 are permitted.

On the other hand, when the battery 11 is determined as non-genuine in step 41 (the first checker), determined as not functionally-proper in step 42 (the second checker), or determined as illegally-acquired in step 43, the battery 11 is an abnormal battery. The process proceeds to steps 44 to 48 when determination in one of step 41, 42, and 43 is negative. Therefore, in steps 44 to 48, a countermeasure process is performed. In step 44 the user (e.g., a driver of the vehicle 10) is notified that a non-compliant battery is used in the vehicle 10. In step 44, the display unit 15 displays use of an abnormal battery. Steps 45 to 48 serve as a transmission unit for transmitting information indicative of the use of the non-compliant battery from the vehicle 10 to the servers VHMS 24 and ADOS 26 through WAN 23. The transmission unit transmits the information to the recording device of an organization related to a battery-driven device or related to a battery. It should be understood that information may also be transmitted to other servers.

In step 45, a report that a non-compliant battery is used is transmitted to the vehicle manufacturer. The reporting of the use of the non-compliant battery is performed by transmitting the non-compliant battery information to the server VHMS 24 of the vehicle manufacturer, and by recording the transmitted information to the recording device of the server VHMS 24. In step 45, vehicle information to identify a subject vehicle and battery information about the battery 11 which is determined as non-compliant are transmitted. The vehicle information includes at least one of a body number of the vehicle, a registration number (i.e., a symbol on a license plate) of the vehicle, vehicle owner information, vehicle management information (i.e., information about a person managing the vehicle), and vehicle user information (i.e., information about a person using the vehicle). The battery information includes at least one of whether a battery is genuine and whether a battery is functionally-proper. For example, the battery information may include the identification information of the battery 11 and the management information of the battery 11. The above information is referred to by the vehicle manufacturer, for the purpose of contacting the user of the vehicle 10 and encouraging the user to switch to the normal battery. In addition, the above information is included in a message transmitted by the vehicle manufacturer to the user, for example.

In step 46, use of the non-compliant battery is reported to the administrative organization. The reporting of the use of the non-compliant battery is performed by transmitting the non-compliant battery information to the server 26 of the administrative organization, and by recording the transmitted information to the recording device of the server 26. Step 46 also transmits the above-described vehicle information and the above-described battery information. Further, in step 46, information for advising the vehicle manufacturer to take a necessary measure is transmitted to the vehicle manufacturer. This information notifies the vehicle manufacturer of the use of the non-compliant battery in the vehicle manufactured by the vehicle manufacturer, and encourages/advises the vehicle manufacturer to correct the inappropriate condition (i.e., the use of the non-compliant battery). For example, this information may include information of the manufacturer of the subject vehicle. The above information is referred to by the administrative organization, for the purpose of contacting the user of the vehicle 10 or contacting the vehicle manufacturer. In addition, the above information is included in a message transmitted by the administrative organization to the user, for example.

In step 47, it is determined whether information of the battery manufacturer is included in the information acquired from the battery 11. Step 47 serves as an information checker to determine whether information about a responsible person who is in charge of the battery 11 is available in case that the check result of the battery checker is negative. Because the battery management system 1 authenticates a battery disposed on the vehicle 10, the management information of the genuine battery includes information of the battery manufacturer. In addition, it is assumed that the battery manufacturer who is going to supply the battery which can be installed on the vehicle 10 may or may not store the information of the battery manufacturer in the management information of the battery. For example, the battery manufacturer manufacturing sub-standard batteries (i.e., a copy product) may highly possibly not include the manufacturer information in the management information. Therefore, a series of process is finished when it is determined in step 47 that the information of the battery manufacturer is not included in the management information. On the other hand, the process proceeds to step 48 when the information of the battery manufacturer is included in the management information.

In step 48, information to guide the battery manufacturer is transmitted to the server 26 of the administrative organization. Step 48 also transmits the above-described vehicle information and the above-described battery information. Further, in step 48, information for advising the battery manufacturer to take a necessary measure is transmitted to the battery manufacturer. This information may include, for example, information of the battery manufacturer. Step 48 serves as the transmission unit for transmitting information of a responsible person who is in charge of the battery 11, in case that the check result of the information checker is positive. This information is recorded to the recording device in the server ADOS 26. This information is used (a) by the administrative organization for notifying the battery manufacturer that the battery manufactured by the battery manufacturer is used as a non-compliant battery (i.e., the battery is used in an inappropriate condition), and (b) for advising the battery manufacturer to correct the above-described inappropriate condition regarding the use of the battery. This information is referred to by the administrative organization for contacting the battery manufacturer. Further, this information is included in a message transmitted by the administrative organization to the user, for example.

In the present embodiment, a first step for determining that the battery connected to the battery-driven device is compliant or not and a second step for transmitting from the battery-driven device through communication line information indicative of use of the non-compliant battery upon having a negative determination from the first step are performed by the battery control unit 16 and the communication device 14 in the vehicle 10.

According to the battery management apparatus in the present embodiment, non-compliance of the battery 11 can be notified to a device other than the vehicle 10. In addition, non-compliance of the battery 11 in the vehicle 10 can be informed from a device that is different from the vehicle 10, such as the servers 24 or 26. Further, non-compliance of the battery 11 is displayed in the vehicle 10, thereby effectively encouraging the user/driver to use a compliant battery. As a result, use of the non-compliant battery is effectively restrained.

Figure 5:
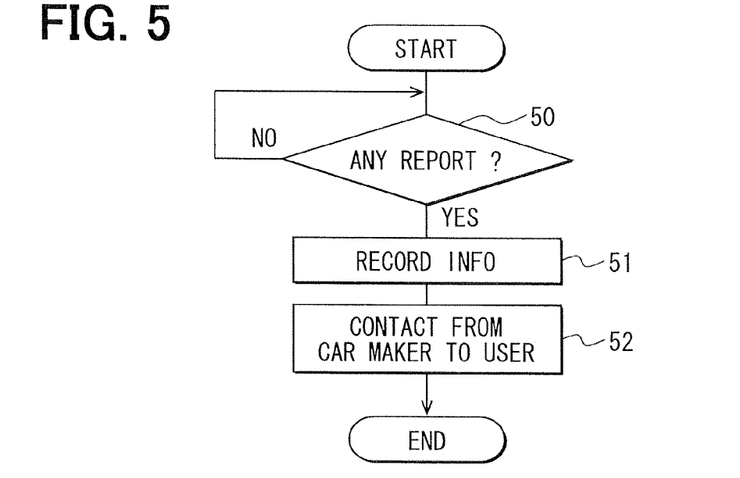
FIG. 5 is a flowchart of control of the battery management system in the first embodiment.

FIG. 5 is a flowchart of process in the server VHMS 24. In step 50, the process checks if a report from step 45 has been received. The server 24 and step 50 serve as "a receiver" in the organization related to the battery 11 or the vehicle 10 for receiving information that is transmitted by the transmission unit. If it is determined that there is no report, step 50 is repeated. When it is determined that a report from step 45 from one the vehicles 10 of its own make has been received, the process proceeds to step 51.

In step 51, the transmitted information is recorded to the recording device of the server VHMS 24. The server VHMS 24 and step 51 serve as a recording device for recording information received by the receiver in the organization.

In step 52, the vehicle manufacturer attempts to contact the user of the vehicle 10. That is, in step 52, a message that encourages the user of the vehicle 10 to stop the use of the non-compliant battery and to switch to a compliant battery is transmitted. This message is displayed on the display unit 15 of the vehicle 10 or on a cellular phone of the user. In other words, step 52 serves as a contact unit in the organization for sending a message that advises the user of the vehicle 10 to use a compliant battery, based on the recorded information in the recording device.

According to the battery management system in the present embodiment, information indicative of non-compliance of the battery 11 of the vehicle 10 is retrievable from the server VHMS 24. In addition, by the contact of the vehicle manufacturer to the user, use of a compliant battery can be effectively advised. As a result, use of the non-compliant battery can be effectively restrained.

Figure 6:
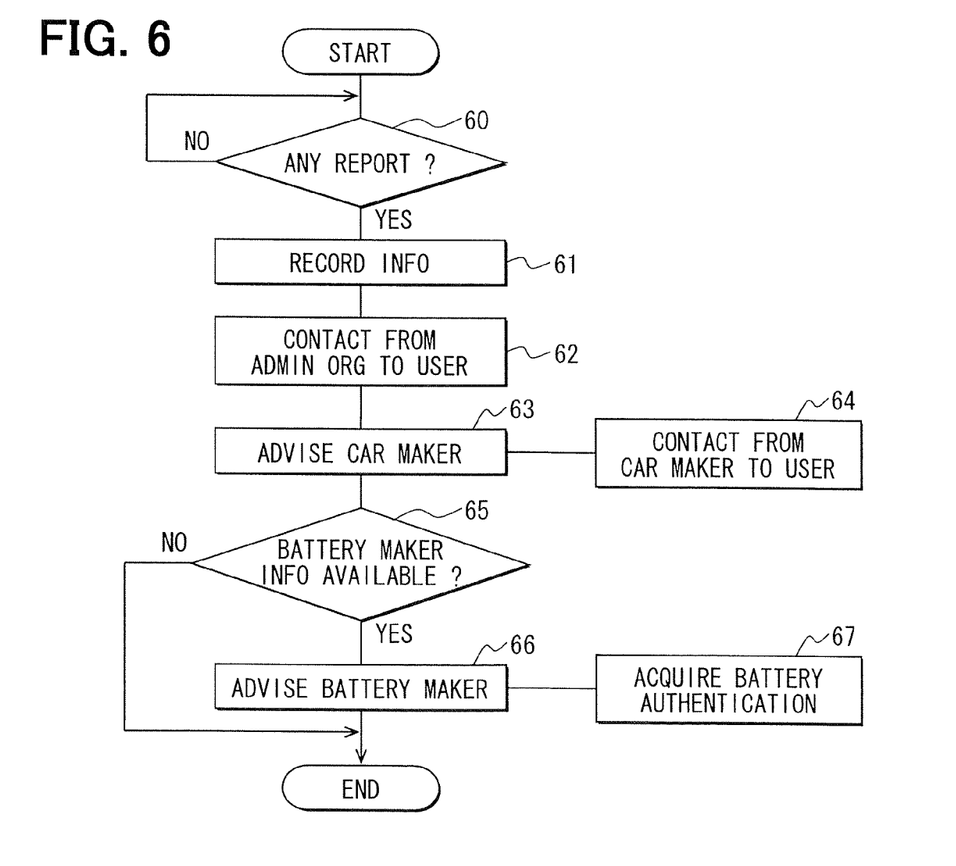
FIG. 6 is a flowchart of control of the battery management system in the first embodiment.

FIG. 6 is a flowchart of process in the server ADOS 26. In step 60, the process checks if a report from step 46 or 48 has been received. The server ADOS 26 and step 60 serve as "a receiver" in the organization related to the battery 11 or the vehicle 10 for receiving information that is transmitted by the transmission unit. If no report has been received, step 60 is repeated. When it is determined that a report from step 46 or step 48 has been received, the process proceeds to step 61.

In step 61, the transmitted information is recorded to the recording device in the server ADOS 26. The server ADOS 26 and step 61 serve as a recording device for recording information received by the receiver in the organization.

In step 62, the administrative organization attempts to contact the user of the vehicle 10. That is, in step 62, a message that encourages the user of the vehicle 10 to stop the use of the non-compliant battery and to switch to a compliant battery is transmitted. This message is displayed on the display unit 15 of the vehicle 10 or on a cellular phone of the user. In other words, step 62 serves as a contact unit in the organization for sending a message that advises the user of the vehicle 10 to use a compliant battery, based on the recorded information in the recording device.

According to the battery management system in the present embodiment, information indicative of non-compliance of the battery of the vehicle 10 is retrievable from the server 26. In addition, by the contact of the administrative organization to the user, the use of the compliant battery can be effectively advised. As a result, the use of the non-compliant battery can be effectively restrained.

In step 63, a message is transmitted from the administrative organization to the vehicle manufacturer of the vehicle 10. This message is transmitted from the server ADOS 26 to the server VHMS 24, and is recorded to the recording device of the server VHMS 24. The message may look like "A non-compliant battery is used in a vehicle "A (i.e., a vehicle's proper name)" of your company, which should only use an authenticated standard battery. Advise the vehicle owner to replace the non-compliant battery at owner's earliest convenience, and advise vehicle maintenance stations to use compliant batteries only." This message is for notifying the vehicle manufacturer of the vehicle 10 about the use of the abnormal battery in the vehicle 10. This message advises the vehicle manufacturer to take necessary measures to correct the abnormal condition regarding the battery.

The vehicle manufacturer advised in step 63 carries out a process of step 64. That is, in step 64, the vehicle manufacturer attempts to contact the user of the vehicle, based on the advice from the administrative organization. The process of step 64 can be carried out by the same process in FIG. 5. Further, the vehicle manufacturer can take measures to dispatch a person in charge based on the customer information of its own.

Therefore, in the present embodiment, a first step for receiving the information, which is transmitted from the battery-driven device, by an organization related to a battery-driven device or a battery, and a second step for recording the received information to the recording device in the organization, and a third step for sending a message that encourages the user of the battery-driven device to use a compliant battery based on the recorded information in the recording device are performed by the server VHMS 24 or by the server ADOS 26.

According to the battery management system in the present embodiment, non-compliance of the battery 11 in the vehicle 10 can be known from the server ADOS 26. In addition, a contact to the user of the vehicle from the vehicle manufacturer is strongly advised based on the advice from the administrative organization. As a result, the use of the non-compliant battery can be restrained effectively.

In step 65, it is determined whether there is information about a battery manufacturer. When there is no information about a battery manufacturer, the process is finished. However, the management information of an abnormal battery is recorded in step 61 to the server ADOS 26 of the administrative organization. Therefore, the administrative organization can take measures for correcting the situation. For example, the administrative organization can take a step (a) to investigate a manufacturer of the abnormal battery, (b) to advise a battery manufacture to acquire authentication of manufacturing an authenticated product, or (c) to expel the copy product from the market. If there is information about a battery manufacturer, the process proceeds to step 66.

In step 66, a message is transmitted from the administrative organization to the battery manufacturer of the battery 11. This message is transmitted from the server ADOS 26 to the server BTMS 25, and this message is recorded to the recording device of the server 25 BTMS. The message may look like "A non-compliant battery is used in a vehicle "A (i.e., a vehicle's proper name)", which should only use an authenticated standard battery. Acquisition of authentication is strongly advised." This message is for notifying the battery manufacturer about installation and use of the abnormal battery in the vehicle 10. This message advises the battery manufacturer to take necessary measures to correct the abnormal condition regarding the battery 11.

The server BTMS 25 of the battery manufacturer who has received an advice in step 66 carries out a process of step 67. In step 67, the battery manufacturer attempts to contact the user of the vehicle, based on the advice from the administrative organization. The process of step 67 can be carried out by the same process as FIG. 5. Further, the battery manufacturer can take steps to acquire an authentication from the administrative organization or from the vehicle manufacturer about the battery of its future make. For example, the battery manufacturer may take steps for the vehicle manufacturer to specify the battery of its make as a genuine product for a certain vehicle.

According to the battery management system in the present embodiment, non-compliance of the battery in the vehicle can be known from the server ADOS 26. In addition, the battery manufacturer can take advice from the administrative organization. As a result, circulation of the non-genuine batteries can be reduced.

Second Embodiment

Figure 7:
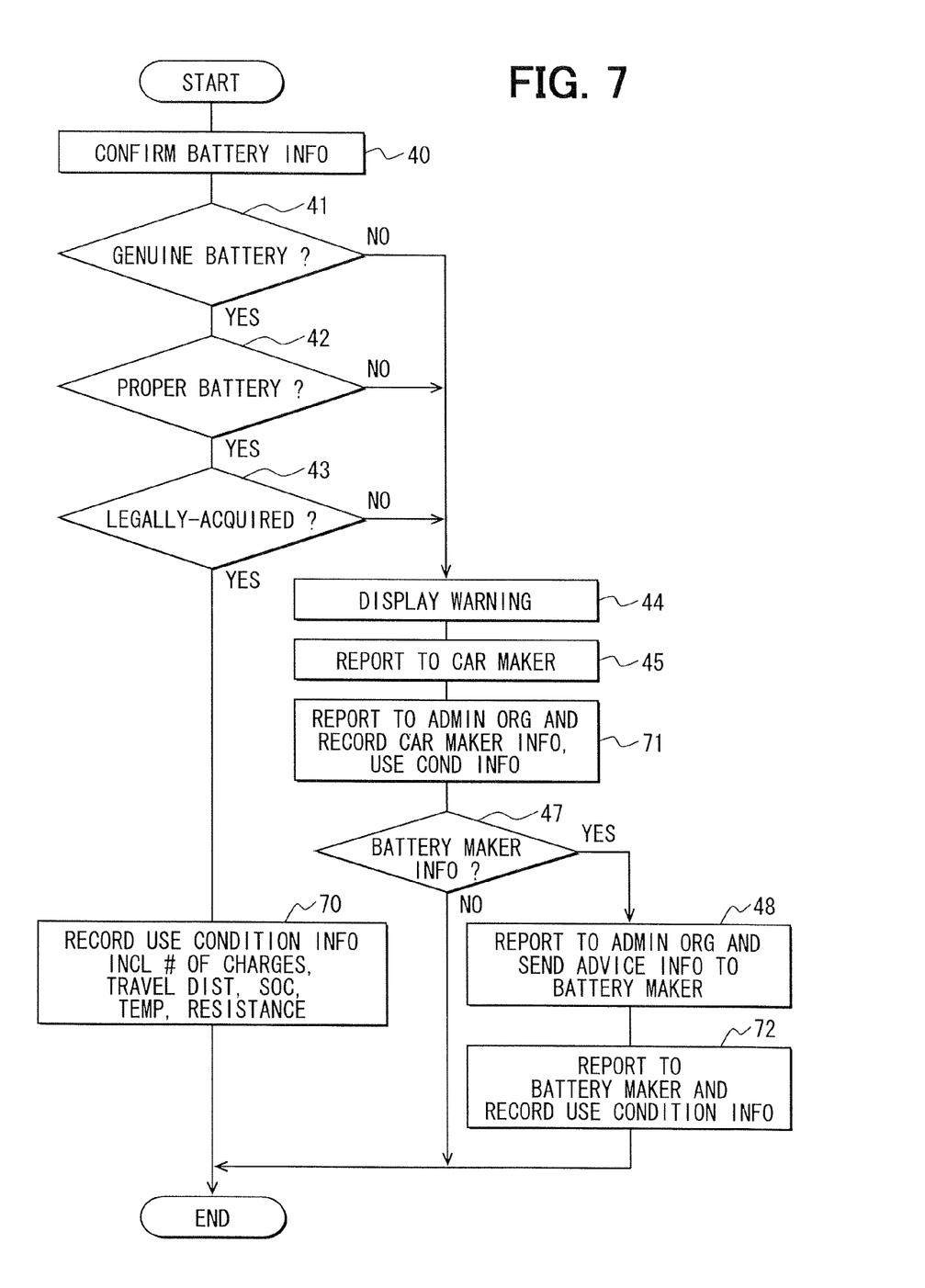
FIG. 7 is a flowchart of control of the battery management system in a second embodiment of the present application.

In the second embodiment, the system uses a charge control process shown in a flowchart of FIG. 7, instead of the one in FIG. 4 of the first embodiment. For the other configurations and components, refer to diagrams and flowcharts in FIGS. 1 to 3, 5, and 6. FIG. 7 is a flowchart of the authentication process. Like numbers show like steps in FIGS. 4 and 7.

In the present embodiment, when the battery is determined as compliant, information of a use condition of the battery 11 (i.e., a battery 11 as a whole) is memorized in the storage device 11$d$ in step 70. Further, in step 70, information of a use condition of the battery module 11$a$ is memorized in the memory device 11$c$. Furthermore, the above information of the use condition may also be memorized to a storage device in the battery control unit 16. Memorization process in step 70 may be performed in a cumulative manner. As a result, the information of the use condition of the battery 11 is accumulated. The accumulated use condition information can be called history information of the use condition of the battery. This history information may also be called an operation history of the battery.

As for the use condition information, information regarding use environment of the battery 11, an amount of electric load, a charge characteristic, a discharge characteristic, a period of use can be used. More practically, at least one of the number of charge operations of the battery 11, time of use of the battery 11, mileage of travel for which the battery 11 is used, a charge condition of the battery 11 (SOC: State of Charge), temperature of the battery 11, and an internal resistance of the battery 11 can be used as the use condition information.

In step 71, transmission of the use condition information to the server ADOS 26 of the administrative organization is performed in addition to the process of step 46. The server ADOS 26 receives the use condition information, and saves the received information. The use condition information saved in the server ADOS 26 is used for user contact in step 62, for providing an advice in step 63, and for providing an advice in step 66. The server ADOS 26 may have a device for determining whether a degradation speed of the battery 11 in the vehicle 10 is faster than a threshold or not, based on the use condition information.

For example, for the purpose of specifying a battery as a genuine product, the administrative organization may obligate the battery manufacturer to submit standard product data, which shows change of the internal resistance in association to the number of charges and/or travel distance. In this case, quality of the battery 11 can be estimated based on the comparison between the standard product data and the use condition information. More practically, if the increase of the internal resistance value shown in the use condition information that has been transmitted from the vehicle 10 is faster than the standard product data, the degradation of the battery 11 is estimated to be faster. In other words, a quality of the battery 11 on the vehicle 10 may be determined as lower than a standard battery. In such a case, the administrative organization may advise the vehicle manufacturer and/or the battery manufacturer to improve the quality of the battery.

In step 72, the use condition information is transmitted to the server 25 of the battery manufacturer. The server 25 receives the use condition information, and the received information is memorized. The use condition information memorized to the server 25 is used for quality control of the battery 11 or improvement of the battery 11 by the battery manufacturer. The server 25 may have a device for determining whether a degradation speed of the battery 11 in the vehicle 10 is faster than a threshold or not, based on the use condition information. For example, when the change of the internal resistance is worse than a design value, the use condition information can be utilized to identify/estimate the cause of such change.

The use condition information to be transmitted to the server ADOS 26 of the administrative organization and the use condition information to be transmitted to the server BTMS 25 of the battery manufacturer may be the same, or may be different. For example, the information of the use condition may be transmitted to the server ADOS 26 for the comparison with the standard product data. Further, for example, information only regarding the number of charges, the travel distance and the internal resistance value may be transmitted to the server ADOS 26. On the other hand, to the server BTMS 25, information regarding the quality control operation, design and development operation or the like may be transmitted. In such a case, the amount of information transmitted to the server BTMS 25 is greater than the amount of information transmitted to the server ADOS 26. For example, information regarding the number of charges, the travel distance, SOC, temperature of the battery, the internal resistance are transmitted to the server BTMS 25.

According to the present embodiment, the use condition information of the battery may be notified to the related organization from the vehicle 10. Therefore, a contact to the vehicle user can be made more significant and meaningful. Further, the advice for the related organization can also be made more significant and meaningful. Furthermore, more valuable and effective information in terms of quality control, improvement and development of the battery may be provided for, for example, the battery manufacturer.

Other Embodiments

Although the present disclosure has been fully described in connection with disclosed embodiments thereof with reference to the accompanying drawings, it is to be noted that various changes and modifications will become apparent to those skilled in the art.

For example, when a non-compliant battery is used, charge to the battery module may be prohibited or may be limited. In addition, when a non-compliant battery is used, the use of the battery module may be prohibited or may be limited. Further, a device for reporting the use of an illegally-acquired battery may be provided.

In the second embodiment, when the battery 11 is determined as a non-compliant battery, the use state information accumulated in the server of the related organization is transmitted. Instead, regardless of the authentication process of the battery, the accumulated use condition information accumulated for a certain period of time may be transmitted. In such a configuration, the use condition information of the battery can be notified to the related organization from the vehicle 10. In addition, in step 70, the use condition information may be transmitted to the server of the related organization, and the use condition information may be accumulated in that server. Further, the use condition information may also be transmitted to the server VHMS 24 of the vehicle manufacturer.

Further, the function of the control unit may be implemented solely by software, or solely by hardware, or by a combination of software and hardware. That is, for example, the control unit may be implemented by an analog circuit.

Such changes, modifications, and summarized schemes are to be understood as being within the scope of the present disclosure as defined by appended claims.

What is claimed is:

1. A battery management system for use in a vehicle comprising:
    a battery checker to determine if a battery in a battery driven device is compliant to a maker-specified requirement, wherein the battery-driven device is the vehicle, wherein the battery checker includes
    a first checker to determine if the battery is a genuine product based on identification information of the battery including at least one of a code for indicating whether the battery is a genuine battery or a code for indicating whether the battery module was distributed through an authorized distribution channel, and
    a second checker to determine if the battery is functional based on management information of the battery including at least one of a warranty period, a maximum number of charge operations, a charge condition, or a discharge condition indicating non-compliance with the maker-specified requirement when at least one of the first checker and the second checker yields a negative check result;
    a transmission unit to send out information indicative of a use condition of the battery from the battery-driven device and a check result of the battery by the battery checker indicating non-compliance with the maker-specified requirement when at least one of the first checker and the second checker yields a negative check result;
    a receiver in an organization that is related to the battery-driven device or the battery for receiving a transmission from the transmission unit;
    a recorder in the organization for recording the information received by the receiver via the transmission; and
    a contact in the organization for sending a message to a user of the battery-driven device based on the information recorded by the recorder, wherein
    the message encourages the user to use a battery that is compliant to the maker-specified requirement;
    wherein the battery checker is further configured to
    determine whether the management information of the battery further includes a battery manufacturer information; and
    cause the transmission unit to send out further information indicating non-compliance of the battery and including vehicle information to identify the vehicle, and battery information about the battery which was determined not to include the battery manufacturer information.

2. The battery management system of claim 1, wherein the transmission unit sends the information to the recorder of the organization related to one of the battery-driven device and the battery.

3. The battery management system of claim 1 further comprising an information checker for checking whether battery liability information indicative of battery liability is available, wherein the transmission unit sends the battery liability information when the information checker outputs a positive check result.

4. The battery management system of claim 1, wherein the first checker is configured to
    determine whether the battery is the genuine product based on both the code for indicating whether the battery is the genuine battery and the code for indicating whether the battery module was distribute through the authorized distribution channel.

5. A method of managing a battery for use in a vehicle comprising:
- checking whether a battery connected to a battery-driven device is compliant to a maker-specified requirement according to a first checker to determine if the battery is a genuine product based on identification information of the battery and a second checker to determine if the battery is functional based on management information of the battery, wherein the battery-driven device is the vehicle, wherein
- the identification information includes at least one of a code for indicating whether the battery is a genuine battery or a code for indicating whether the battery module was distributed through an authorized distribution channel, and
- the management information includes at least one of a warranty period, a maximum number of charge operations, a charge condition, or a discharge condition;
- transmitting information indicative of use of a non-compliant battery, from the battery-driven device when the checked battery is the non-compliant battery, to an organization related to one of the battery-driven device and the battery; and
- recording the transmitted information in a recorder of the organization, wherein
- the organization is a public administration that administers a responsible organization that is at least responsible for the battery driven device or the battery
- sending a message to a user of the battery-driven device based on the information recorded by the recorder, from the organization:
- wherein the message encourages the user to use a battery that is compliant to the maker-specified requirement; and
- determining whether the management information of the battery further includes a battery manufacturer information; and
- sending out further information indicating non-compliance of the battery and including vehicle information to identify the vehicle, and battery information about the battery which was determined not to include the battery manufacturer information.

6. The method of claim 5, wherein the first checker comprises
- determining whether the battery is the genuine product based on both the code for indicating whether the battery is the genuine battery and the code for indicating whether the battery module was distribute through the authorized distribution channel.

* * * * *